(12) United States Patent
Jans

(10) Patent No.: US 9,987,890 B1
(45) Date of Patent: Jun. 5, 2018

(54) TRAILER SYSTEM FOR A ZERO TURN RADIUS VEHICLE

(71) Applicant: Stanley E. Jans, Dakota City, NE (US)

(72) Inventor: Stanley E. Jans, Dakota City, NE (US)

( * ) Notice: Subject to any disclaimer, the term of this patent is extended or adjusted under 35 U.S.C. 154(b) by 0 days. days.

(21) Appl. No.: 15/296,405

(22) Filed: Oct. 18, 2016

(51) Int. Cl.
*B60D 1/167* (2006.01)
*B60D 1/14* (2006.01)
*A01B 59/042* (2006.01)

(52) U.S. Cl.
CPC ............ *B60D 1/167* (2013.01); *A01B 59/042* (2013.01); *B60D 1/143* (2013.01)

(58) Field of Classification Search
CPC .................................................... B62D 53/021
See application file for complete search history.

(56) References Cited

U.S. PATENT DOCUMENTS

| | | | |
|---|---|---|---|
| 3,912,300 A | 10/1975 | Bryan | |
| 3,998,471 A | 12/1976 | Lutchemeier | |
| 4,664,403 A * | 5/1987 | Livingston | B60D 1/06 280/460.1 |
| 5,520,404 A * | 5/1996 | Schulte | B60D 1/173 280/460.1 |
| 5,810,371 A | 9/1998 | Velke | |
| 5,813,679 A * | 9/1998 | Hobrath | A01D 34/001 172/433 |
| 5,909,887 A * | 6/1999 | Hobrath | A01D 34/001 172/257 |
| 5,910,217 A | 6/1999 | Sargent | |
| 5,947,505 A * | 9/1999 | Martin | B62D 51/02 280/32.7 |
| 6,000,705 A | 12/1999 | Velke | |
| 6,145,855 A * | 11/2000 | Bellis, Jr. | B62D 49/065 280/32.7 |
| 6,488,291 B1 | 12/2002 | Bellis | |
| 6,626,449 B2 * | 9/2003 | Hazen | B60D 1/065 280/460.1 |
| 7,364,180 B2 | 4/2008 | Hensley | |
| 7,740,091 B2 * | 6/2010 | Bartel | A01D 34/68 180/19.1 |
| 8,454,032 B2 * | 6/2013 | Havener | A01D 34/001 280/32.7 |
| 8,454,046 B1 | 6/2013 | Hobbs | |
| 9,340,087 B2 | 5/2016 | Atkinson | |
| 9,457,848 B2 * | 10/2016 | Pugh | B62D 49/0678 |
| 9,592,862 B2 * | 3/2017 | Pugh | B62D 49/04 |

(Continued)

*Primary Examiner* — Kevin Hurley
(74) *Attorney, Agent, or Firm* — Jeffrey A. Proehl; Woods, Fuller, Shultz & Smith, P.C.

(57) ABSTRACT

A trailer for a tractor may include a platform having a frame with an axle frame member and swivel mountings, and a pair of wheels each being mounted to rotate and swivel. A linkage connects the platform to the tractor, with a forward mount configured to mount on the tractor and permit the linkage to pivot about a pivot axis extending substantially perpendicular to a longitudinal axis of the trailer. The linkage has a rearward mount configured to mount on the platform and permit the linkage to pivot about a roll axis extending substantially parallel to the longitudinal axis of the trailer. In embodiments, the rearward mount includes a roll joint located at a juncture of the linkage and the platform, and the juncture is located substantially in a vertical lateral plane extending between the swivel mountings of the platform.

20 Claims, 4 Drawing Sheets

(56) References Cited

U.S. PATENT DOCUMENTS

| | | |
|---|---|---|
| 2005/0056438 A1 | 3/2005 | Nordhoff |
| 2008/0224432 A1 | 9/2008 | Lundh |
| 2009/0096178 A1 | 4/2009 | Beal |
| 2010/0164202 A1 | 7/2010 | Dilworth |

\* cited by examiner

TRAILER SYSTEM FOR A ZERO TURN RADIUS VEHICLE

BACKGROUND

Field

The present disclosure relates to vehicle trailers and more particularly pertains to a new trailer system for a zero turn radius vehicle for providing a platform to facilitate use of a variety of accessories with the tractor.

SUMMARY

In one aspect, the disclosure relates to a trailer for a tractor, with the trailer having a front and a rear and a longitudinal axis. The trailer may comprise a platform including a frame with an axle frame member and swivel mountings located on opposite ends of the axle frame member. The platform may include a pair of wheels, with each of the wheels being mounted on the frame in a manner permitting rotation of the wheel about a horizontal rotation axis and rotation about a vertical swivel axis. Each of the wheels may be mounted on one of the swivel mountings on the frame, and the vertical swivel axes of the wheels may define a vertical lateral plane. The trailer may also include a linkage connecting the platform to the tractor, with the linkage having a front end for positioning toward the tractor and a rear end for positioning toward the platform. The linkage may include a forward mount configured to mount on the tractor and configured to permit the linkage to pivot about a pivot axis with respect to the tractor. The pivot axis may extend laterally and substantially perpendicular to the longitudinal axis of the trailer. The linkage may also include a rearward mount mounted on the platform and configured to permit the linkage to pivot about a roll axis with respect to the platform. The roll axis may extend substantially parallel to the longitudinal axis of the trailer, and the rearward mount may comprise a roll joint including a roll shaft extending between and the linkage and the platform. The roll joint may be located at a juncture of the linkage and the platform, and the juncture may be located substantially in the vertical lateral plane of the platform.

In another aspect, the disclosure relates to a utility vehicle system comprising a tractor and a trailer for a tractor, with the trailer having a front and a rear and a longitudinal axis. The trailer may comprise a platform including a frame with an axle frame member and swivel mountings located on opposite ends of the axle frame member. The platform may include a pair of wheels, with each of the wheels being mounted on the frame in a manner permitting rotation of the wheel about a horizontal rotation axis and rotation about a vertical swivel axis. Each of the wheels may be mounted on one of the swivel mountings on the frame, and the vertical swivel axes of the wheels may define a vertical lateral plane. The trailer may also include a linkage connecting the platform to the tractor, with the linkage having a front end for positioning toward the tractor and a rear end for positioning toward the platform. The linkage may include a forward mount mounted on the tractor and configured to permit the linkage to pivot about a pivot axis with respect to the tractor. The pivot axis may extend laterally and substantially perpendicular to the longitudinal axis of the trailer. The linkage may also include a rearward mount mounted on the platform and configured to permit the linkage to pivot about a roll axis with respect to the platform. The roll axis may extend substantially parallel to the longitudinal axis of the trailer, and the rearward mount may comprise a roll joint including a roll shaft extending between and the linkage and the platform. The roll joint may be located at a juncture of the linkage and the platform, and the juncture may be located substantially in the vertical lateral plane of the platform.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
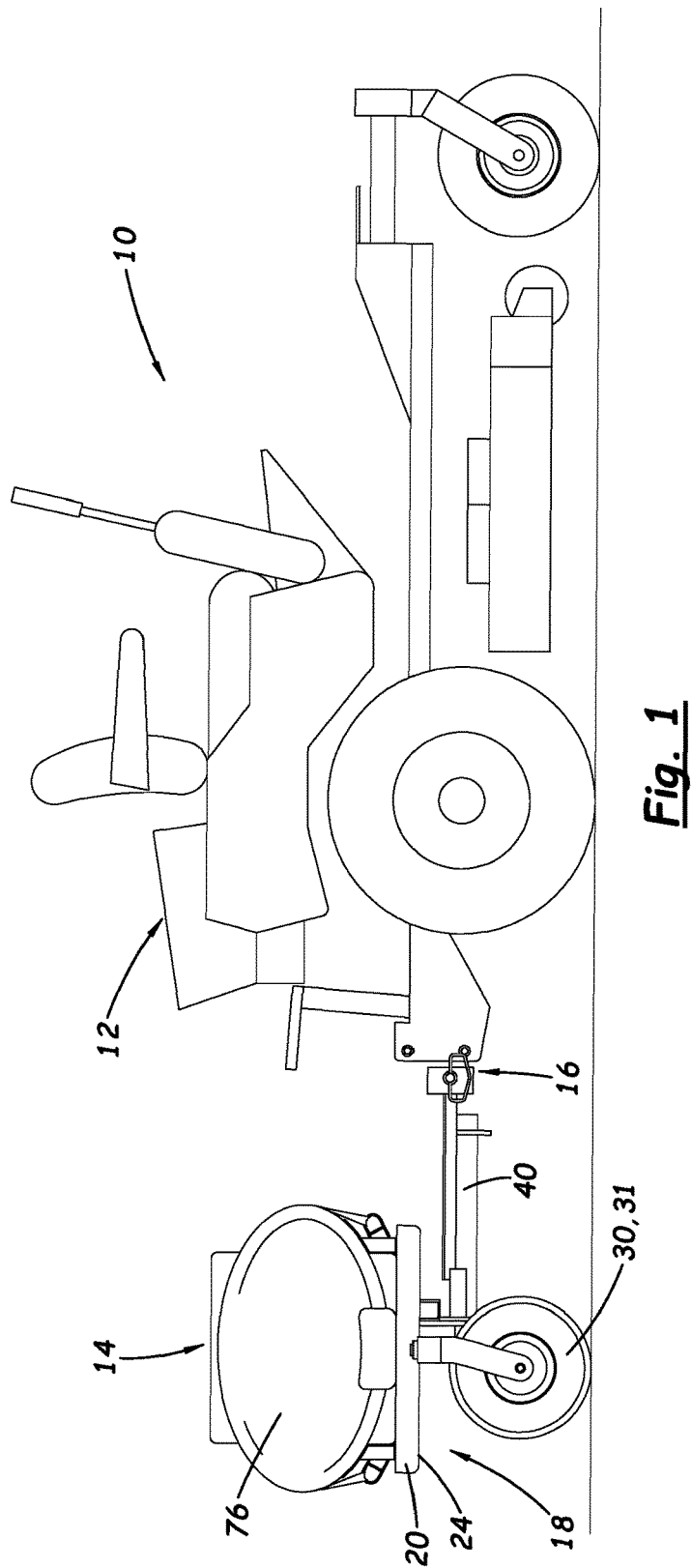
FIG. 1 is a schematic side view of a new trailer system for a zero turn radius vehicle according to the present disclosure.
Figure 2:
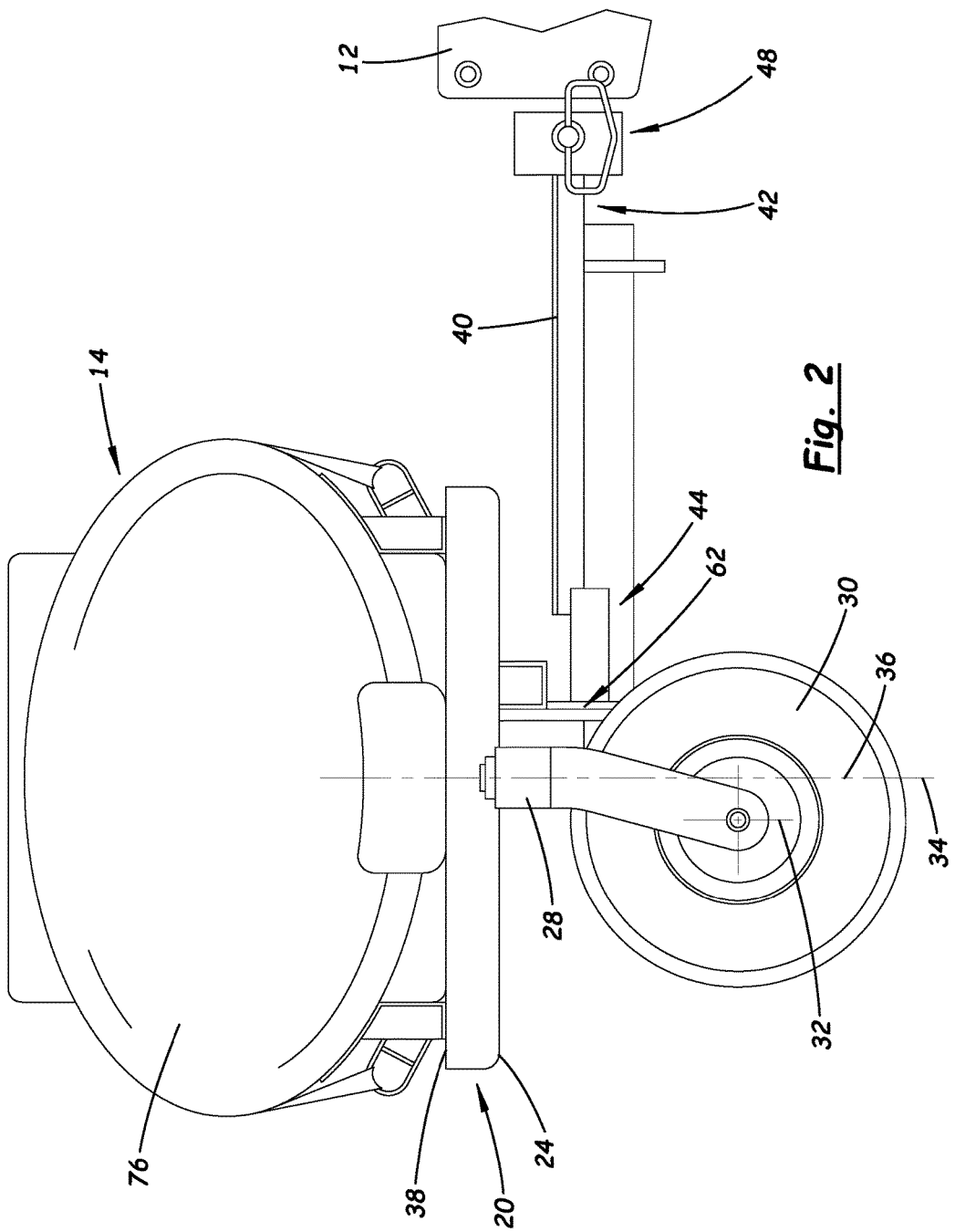
FIG. 2 is a schematic side view of the trailer of the system, according to an illustrative embodiment.
Figure 3:
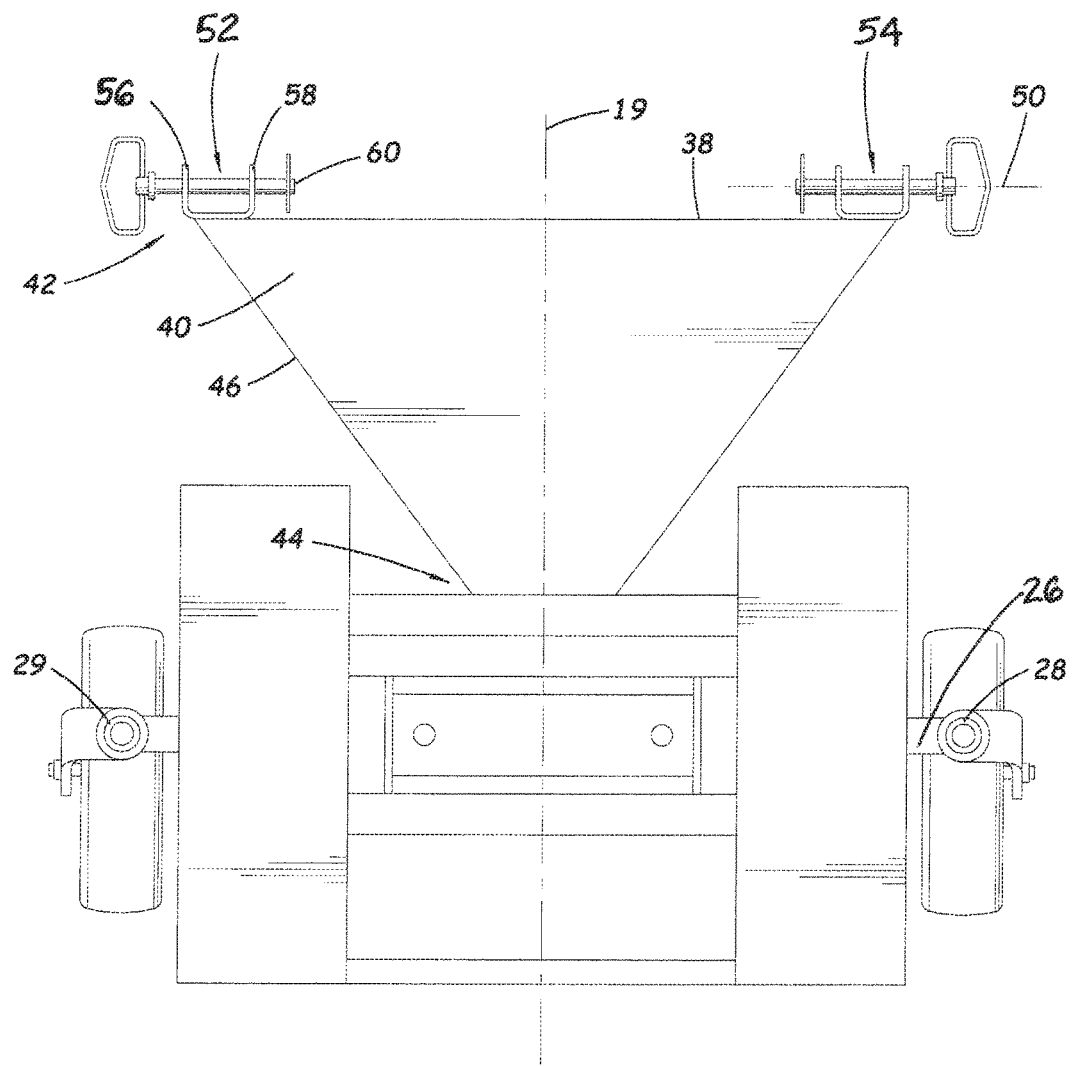
FIG. 3 is a schematic top view of the trailer with the accessory removed to reveal detail of the trailer, according to an illustrative embodiment.
Figure 4:
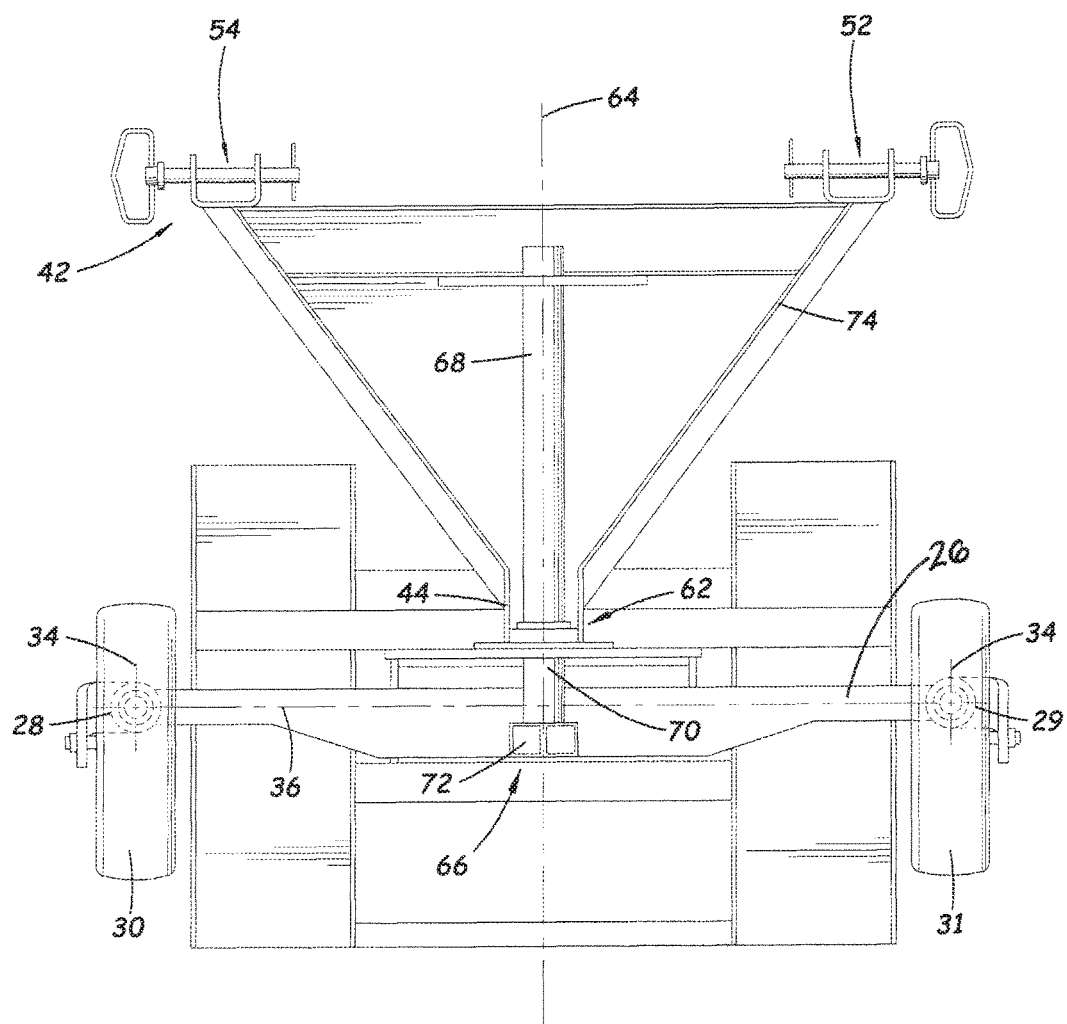
FIG. 4 is a schematic bottom view of the trailer without the accessory, according to an illustrative embodiment.

With reference now to the drawings, and in particular to FIGS. 1 through 4 thereof, a new trailer system for a zero turn radius vehicle embodying the principles and concepts of the disclosed subject matter will be described.

The applicant has recognized that while vehicles or tractors with the "zero turn radius" steering feature are highly maneuverable and therefore useful for performing a variety of tasks, the unique movement possible with zero turn radius steering can make pulling a conventional trailer behind the tractor difficult if not impossible. The ability to turn a zero turn radius tractor virtually in place tends to "jackknife" the tractor and trailer if a conventional ball- or pin-type hitch is utilized, or tends to try to slide the wheels of the trailer sideways if a more rigid connection between the tractor and trailer is utilized. The applicant realizes that clearly neither of these situations is easily tolerable particularly when maneuvering over lawn vegetation which can be damaged by the binding or sliding of the trailer. Further, tipping of the trailer under these conditions is also possible and of course undesirable.

The applicant has devised a trailer which is highly suitable for use with a zero turn radius tractor as it minimizes or avoids many of the undesirable characteristics of conventional trailer designs when used with a zero turn radius vehicle. For example, restriction on the movement of the zero turn radius tractor by the trailer may be minimized if not eliminated, as a significant degree of roll of the trailer about a longitudinal axis and pitch of the trailer about a lateral axis may be permitted. Further, lateral sliding of wheels supporting the trailer may be avoided. However, it should also be recognized that aspects of the trailer disclosed may also be used with tractors of more conventional design that do not employ a zero turn radius steering system and such an application may be equally advantageous, particularly for those operators that are not skilled at backing up vehicles with a trailer attached.

In one aspect, the disclosure relates to a utility vehicle system 10 which may include a tractor 12, such as a tractor with a zero-turn-radius steering capability, and a utility trailer 14 which may be removably attached to the tractor to move with the tractor as it is operated and maneuvered. The trailer 14 may have a front 16 which is generally oriented toward the tractor 12 when the trailer is hitched to the tractor, and a rear 18 which is located generally opposite of the front 16. A longitudinal axis 19 of the trailer may be generally aligned with a longitudinal axis of the tractor and may generally represent the direction of movement of the tractor and trailer when the tractor is moving in a forward direction.

The trailer 14 may include a platform 20 and a linkage 40 which connects the platform of the trailer to the tractor. The platform 20 may include a frame 24 for providing structure to the platform. The frame may include an axle frame member 26 and swivel mountings 28, 29 which are located on opposite ends of the axle frame member and are generally positioned on opposite lateral sides of the trailer. At least one wheel 30 may be mounted on the frame, and some of the most preferable embodiments include a pair of the wheels 30, 31 for improved weight capacity and stability of the trailer. Each of the wheels 30, 31 may be mounted on the frame in a manner that permits rotation of the wheel about a horizontal rotation axis 32. Further, each of the wheels 30, 31 may be mounted on the frame in a manner that also permits rotation about a vertical swivel axis 34. Each of the wheels 30, 31 may be mounted on one of the swivel mountings 28, 29 on the frame and illustratively may comprise a caster wheel. The vertical swivel axis 34 of the swivel mountings 28, 29 may define a vertical lateral plane 36 that generally extends laterally with respect to the longitudinal axis 19 of the trailer. In some embodiments, a support plate 38 may be mounted on the frame 24 to provide a surface for support of cargo or other items to be transported by the trailer.

The linkage 40 which connects the platform to the trailer may be located forwardly of the platform and have a front end 42 for positioning toward the tractor 12 and a rear end 44 for positioning toward the platform 20. In some embodiments, the linkage 40 may have a perimeter 46 which may be substantially triangular in shape with a relatively narrow width located toward the rear end 44 and a relatively wider width located toward the front end 44.

The linkage 40 may include a forward mount 48 which is configured to mount on the tractor. Further, the forward mount may be configured to permit the linkage to pivot about a substantially horizontal pivot axis 50 with respect to the tractor. The pivot axis 50 may extend laterally and may be oriented substantially perpendicular to the longitudinal axis 19 of the trailer. The forward mount 48 may include a pair of connections 52, 54 which may be laterally spaced from each other and may each be laterally spaced from the central longitudinal axis of the trailer. The connections 52, 54 may be configured to permit pivoting of the trailer with respect to the tractor about the pivot axis 50. Illustratively, each of the connections 52, 54 may comprise a first tab 56 which may extend rearwardly from the tractor, and a second tab 58 which extends forwardly from the linkage. Each connection may also include a pin 60 which may extend through the first tab 56 and the second tab 58 to connect the first and second tabs together in a manner permitting pivot movement. The pin 60 may extend along the pivot axis 50.

The linkage 40 may also include a rearward mount 62 which is configured to mount on the platform. Further, the rearward mount 62 may be configured to permit the linkage 40 to pivot about a substantially horizontal roll axis 64 with respect to the platform. The roll axis 64 may extend longitudinally and be substantially parallel to the longitudinal axis 19 of the trailer. The rearward mount 62 may comprise a roll joint 66 including a roll shaft 68 which may extend between the linkage 40 and the platform 20. The roll joint 66 may be located at a juncture 70 of the linkage and the platform which may be located on the roll shaft 68. The linkage and platform rotate with respect to each other about the roll shaft at the juncture. In some embodiments, the roll shaft 68 is fixed to the linkage in a manner that prevents rotation of the roll shaft with respect to the linkage, and the roll shaft is rotatable with respect to the platform. A bearing 72 may be mounted on the platform which receives the roll shaft and permits the roll shaft to rotate with respect to the platform. Optionally, the roll shaft may rotate with respect to the linkage and be fixed with respect to the platform, or the roll shaft may be able to rotate with respect to both the linkage and the platform, although these variations are less preferred. The roll shaft may extend from the rear end 44 of the linkage toward the front end 42, and in some implementations may extend all the way to the front end.

The juncture 70 may be located substantially in the vertical lateral plane 36 of the platform such that the platform rolls with respect to the linkage at a location between the swivel mountings 28, 29. The juncture 70 may be located substantially on an axis that connects the swivel mountings of the frame together such that the juncture is located at substantially the same vertical height from the ground surface as the swivel mountings. The linkage 40 may also include a linkage frame 74 which extends along the perimeter 46 of the linkage and may have a substantially triangular shape.

The system 10 may also include an accessory 76 which is integrally or removably mounted on the platform 20 or to the platform frame 24. The accessory 76 may be a variety of different implements suitable for use with a tractor, and may include, for example, a sprayer with a tank for holding liquid to be sprayed, a spreader with a hopper to hold material to be spread, a lawn clipping bag or bagger, or simply a box with or without a capability to dump the contents.

In embodiments of the invention, the degree of roll but the longitudinal axis may permit one wheel of the trailer to rise as much as approximately 12 inches as compared to the other wheel of the trailer.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A trailer for a tractor, the trailer having a front and a rear and a longitudinal axis, the trailer comprising:
    a platform including a frame with an axle frame member and swivel mountings located on opposite ends of the axle frame member, the platform including a pair of wheels, each of the wheels being mounted on the frame in a manner permitting rotation of the wheel about a horizontal rotation axis and rotation about a vertical swivel axis, each of the wheels being mounted on one of the swivel mountings on the frame, the vertical swivel axes of the wheels defining a vertical lateral plane; and
    a linkage connecting the platform to the tractor, the linkage having a front end for positioning toward the tractor and a rear end for positioning toward the platform, the linkage including:
        a forward mount configured to mount on the tractor, the forward mount being configured to permit the linkage to pivot about a pivot axis with respect to the tractor, the pivot axis extending laterally and substantially perpendicular to the longitudinal axis of the trailer;
        a rearward mount mounted on the platform, the rearward mount being configured to permit the linkage to pivot about a roll axis with respect to the platform, the roll axis extending substantially parallel to the longitudinal axis of the trailer, the rearward mount comprising a roll joint including a roll shaft extending between and the linkage and the platform, the roll joint being located at a juncture of the linkage and the platform; and
        wherein the juncture is located substantially in the vertical lateral plane of the platform.

2. The trailer of claim 1 wherein the juncture is located substantially along an axis connecting the swivel mountings of the frame of the platform such that the juncture is located at substantially the same vertical height as the swivel mountings.

3. The trailer of claim 1 additionally comprising an accessory mounted on the platform.

4. The trailer of claim 1 wherein the pivot axis extends substantially horizontally.

5. The trailer of claim 1 wherein the roll axis extends substantially horizontally.

6. The trailer of claim 1 wherein each of the wheels comprises a caster wheel.

7. The trailer of claim 1 wherein the juncture is located on the roll shaft.

8. The trailer of claim 1 wherein the forward mount includes a pair of connections laterally spaced from the longitudinal axis of the trailer.

9. The trailer of claim 8 wherein each of the connections comprises a first tab extending rearwardly from the tractor, a second tab extending forwardly from the linkage, and a pin extending through the first tab and the second tab.

10. The trailer of claim 1 wherein the roll shaft is fixed to the linkage against rotation and the roll shaft rotates with respect to a bearing mounted on the platform.

11. A utility vehicle system comprising:
    a tractor having zero-turn radius steering; and
    a trailer for the tractor, the trailer having a front and a rear and a longitudinal axis, the trailer comprising:
        a platform including a frame with an axle frame member and swivel mountings located on opposite ends of the axle frame member, the platform including a pair of wheels, each of the wheels being mounted on the frame in a manner permitting rotation of the wheel about a horizontal rotation axis and rotation about a vertical swivel axis, each of the wheels being mounted on one of the swivel mountings on the frame, the vertical swivel axes of the wheels both lying in and defining a common vertical lateral plane; and
        a linkage connecting the platform to the tractor, the linkage having a front end for positioning toward the tractor and a rear end for positioning toward the platform, the linkage including:
            a forward mount mounted on the tractor, the forward mount being configured to permit the linkage to pivot about a pivot axis with respect to the tractor, the pivot axis extending laterally and substantially perpendicular to the longitudinal axis of the trailer;
            a rearward mount mounted on the platform, the rearward mount being configured to permit the linkage to pivot about a roll axis with respect to the platform, the roll axis extending substantially parallel to the longitudinal axis of the trailer, the rearward mount comprising a roll joint including a roll shaft extending between and the linkage and the platform, the roll joint being located at a juncture of the linkage and the platform; and
            wherein the common vertical lateral plane intersects the juncture of the linkage and the platform.

12. The system of claim 11 additionally comprising an accessory mounted on the platform.

13. The system of claim 11 wherein the pivot axis extends substantially horizontally.

14. The system of claim 11 wherein the roll axis extends substantially horizontally.

15. The system of claim 11 wherein each of the wheels comprises a caster wheel.

16. The system of claim 11 wherein the juncture is located on the roll shaft.

17. The system of claim 11 wherein the forward mount includes a pair of connections laterally spaced from the longitudinal axis of the trailer.

18. The system of claim 17 wherein each of the connections comprises a first tab extending rearwardly from the tractor, a second tab extending forwardly from the linkage, and a pin extending through the first tab and the second tab.

19. The system of claim 11 wherein the roll shaft is fixed to the linkage against rotation and the roll shaft rotates with respect to a bearing mounted on the platform.

20. A trailer for a tractor, the trailer having a front and a rear and a longitudinal axis, the trailer comprising:
 a platform including a frame with an axle frame member and swivel mountings located on opposite ends of the axle frame member, the platform including a pair of wheels, each of the wheels being mounted on the frame in a manner permitting rotation of the wheel about a horizontal rotation axis and rotation about a vertical swivel axis, each of the wheels being mounted on one of the swivel mountings on the frame, the vertical swivel axes of the wheels both lying in and defining a common vertical lateral plane; and
 a linkage connecting the platform to the tractor, the linkage having a front end for positioning toward the tractor and a rear end for positioning toward the platform, the linkage including:
  a forward mount configured to mount on the tractor, the forward mount being configured to permit the linkage to pivot about a pivot axis with respect to the tractor, the pivot axis extending laterally and substantially perpendicular to the longitudinal axis of the trailer;
  a rearward mount mounted on the platform, the rearward mount being configured to permit the linkage to pivot about a roll axis with respect to the platform, the roll axis extending substantially parallel to the longitudinal axis of the trailer, the rearward mount comprising a roll joint including a roll shaft extending between and the linkage and the platform, the roll joint being located at a juncture of the linkage and the platform; and
 wherein the common vertical lateral plane intersects the juncture of the linkage and the platform.

* * * * *